United States Patent
Matt (10) Patent No.: US 9,030,190 B2
(45) Date of Patent: *May 12, 2015

(54) MEASURING DEVICE

(71) Applicant: KROHNE Messtechnik GmbH, Duisburg (DE)

(72) Inventor: Achim Matt, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 291 days.

This patent is subject to a terminal disclaimer.

(21) Appl. No.: 13/646,982

(22) Filed: Oct. 8, 2012

(65) Prior Publication Data

US 2013/0249534 A1    Sep. 26, 2013

(30) Foreign Application Priority Data

Mar. 22, 2012    (DE) .......................... 10 2012 005 637

(51) Int. Cl.
   *G01R 1/04*    (2006.01)
   *G01R 11/04*   (2006.01)
   *G01D 11/24*   (2006.01)

(52) U.S. Cl.
   CPC ...................................... *G01D 11/24* (2013.01)

(58) Field of Classification Search
   CPC ......... G01R 11/04; G01R 11/06; G01D 11/24
   USPC ..................... 324/156, 157; 73/431, 204.26
   See application file for complete search history.

(56) References Cited

U.S. PATENT DOCUMENTS

| | | | |
|---|---|---|---|
| 3,462,539 A | 8/1969 | Winston | |
| 4,047,242 A | 9/1977 | Jakob et al. | |
| 4,465,743 A * | 8/1984 | Skarstad et al. | 429/105 |
| 5,546,804 A * | 8/1996 | Johnson et al. | 73/431 |
| 5,777,850 A | 7/1998 | Jakob et al. | |
| 5,954,526 A | 9/1999 | Smith | |
| 6,366,436 B1 | 4/2002 | Maier et al. | |
| 6,508,131 B2 | 1/2003 | Frick | |
| 6,556,447 B2 | 4/2003 | Cudini et al. | |

(Continued)

FOREIGN PATENT DOCUMENTS

| | | |
|---|---|---|
| DE | 41 09 475 A1 | 9/1992 |
| DE | 101 26 654 A1 | 12/2002 |

(Continued)

OTHER PUBLICATIONS

Operating Instruction for Proline Promass E 200 Hart, Coriolis Mass Flow Measuring System, Endress + Hauser, pp. 1-116.

(Continued)

*Primary Examiner* — Reena Aurora
(74) *Attorney, Agent, or Firm* — Roberts Mlotkowski Safran & Cole, P.C.; David S. Safran (57) ABSTRACT

A measuring device (1) with a housing (2) and two electronic devices (3, 4). To provide a measuring device whose electronics are modular, enabling easy adaptation to self-protection, the measuring device is provided with at least one encapsulated contact element (5) that is designed separately from the electronic units (3, 4) and the housing (2) and is arranged between the two electronic units (3, 4). Furthermore, the contact element (5) has at least one electronic transmission element (6) for creating an electric connection between the two electronic units (3, 4).

9 Claims, 5 Drawing Sheets

(56) References Cited

U.S. PATENT DOCUMENTS

| | | |
|---|---|---|
| 6,778,389 B1 | 8/2004 | Glovatsky et al. |
| 7,816,772 B2 | 10/2010 | Engel et al. |
| 7,894,175 B2 | 2/2011 | Florin et al. |
| 8,726,729 B2 | 5/2014 | Matt |
| 2010/0046177 A1 | 2/2010 | Rapp et al. |
| 2010/0208769 A1 | 8/2010 | Martin et al. |
| 2011/0317390 A1 | 12/2011 | Moser et al. |
| 2012/0032822 A1 | 2/2012 | Brockhaus |

FOREIGN PATENT DOCUMENTS

| | | |
|---|---|---|
| DE | 203 14 618 U1 | 11/2003 |
| DE | 102 33 296 A1 | 2/2004 |
| DE | 103 27 013 A1 | 12/2004 |
| DE | 20 2005 017 626 U1 | 2/2006 |
| DE | 10 2004 044 890 A1 | 3/2006 |
| DE | 10 2005 024 259 A1 | 11/2006 |
| DE | 20 2007 006 794 U1 | 9/2007 |
| DE | 20 2009 013 919 U1 | 7/2010 |
| DE | 20 2010 007 043 U1 | 11/2010 |
| DE | 20 2009 011 951 U1 | 2/2011 |
| DE | 10 2009 054 649 A1 | 6/2011 |
| DE | 10 2010 003 743 A1 | 10/2011 |
| DE | 10 2011 004 914 A1 | 9/2012 |
| DE | 10 2012 212 312 A1 | 1/2013 |
| GB | 1 330 512 A | 9/1973 |
| WO | 2008/019838 A1 | 2/2008 |
| WO | 2011/160949 A1 | 12/2011 |

OTHER PUBLICATIONS

Technical Datasheet Optiwave 6300 C, Krohne, Mar. 2014, pp. 1-36.
Handbook for Optiflex 1300 C, Krohne, Aug. 2005, pp. 1-95.

* cited by examiner

MEASURING DEVICE

BACKGROUND OF THE INVENTION

1. Field of the Invention

The invention relates to a measuring device having at least one housing and at least two electronic units.

2. Description of Related Art

Occasionally, so-called construction kits or modular systems are used for the implementation of a wide range of different measuring devices with respect to measurement principles and also to dimensions or prevention classes, etc. In this case, the concerned measuring devices are similarly constructed and assembled from interchangeable components as far as is possible. This has the advantage, on the one hand, of a uniform appearance having a recognition value. On the other hand, this reduces the cost of manufacturing or, respectively provides greater flexibility to adapt to specific requirements of the measuring devices. For this, the measuring devices are mostly divided into individual components that can be combined with each other, which can, in turn, be constructed in a modular manner.

For measuring devices, there is a possible separation between sensor units, in which the measurement principle for the actual measurement of the process variable is implemented, and electronic units, which evaluate or process the raw data or measurement data that the sensor unit generates. Here, the sensor unit can also have its own electronic components used in measurement or, respectively the removal or conversion of raw data. Both the sensor and the electronic unit are usually arranged in a respective housing, wherein the housing of the sensor unit has, where applicable, an opening for direct contact with the measurement medium to be measured and the housing of the electronic unit has at least one opening for power supply or transmission of measured values, for example, to a higher-level unit. Furthermore, the two housings are usually designed in such a manner, that they can be connected with each other and that also energy or signals can be transmitted between the sensor and the electronic unit.

An electronic unit can be further divided into several modules that are possibly even arbitrarily interchangeable or combinable. Partitions are possible in a central unit, which are used for energy supply, for the control system, for the measurement and the processing of signals from the sensor unit into output signals, in a connecting or converting unit, for connecting the measuring device and, in the case of a display or control unit, for displaying the measured value or, respectively for operating the measuring device on site.

Depending on the degree of modularization, any ports for different bus systems can be combined with any display units and different types of sensors. A modular design of the electronic unit is shown for example, in the published German Patent Application DE 10 2006 009 827 A1 and corresponding to U.S. Pat. No. 7,894,175 B2 or German Patent Application DE 10 2009 054 649 A1 or German Patent Application DE 197 82 057 B4 which corresponds to U.S. Pat. No. 5,954,526. The German Patent Application DE 101 26 654 A1 discloses a housing for a measuring device with a display and a separate port space for the inclusion of a display or of a connecting module. A similar structure is disclosed in the European Patent EP 0 775 292 B1 and corresponding U.S. Pat. No. 5,546,804 having a housing with two separate chambers separated by a wall with an opening. The electronic components in the chambers are in contact with one another via signal pins that are molded in the opening. In the German Utility Model DE 203 14 618 U1, a pin casting is encapsulated within a passageway between two compartments of the housing. Another design of a housing and the modular electronic components located therein is described in International Patent Application Publication WO 2011/160949 A1. Plug contacts in a cast measuring device that connect directly to an electronic component and that are used for connection to other electronic elements are disclosed, for example, in German Patent Application DE 102 33 296 A1.

In many applications, intrinsic safety is required by the measuring devices. The ignition protection designation "intrinsically safe" is mainly based on a limitation of the electrical energy within the electronics of the measuring device or within sections of it and the electric energy of connecting lines to a level below the level at which contact with a potentially explosive atmosphere can cause ignition. An essential requirement resulting from relevant standards is the compliance of separation distances between conductive components. The separation distance is the shortest distance between two such components. A distinction is made according to the nature of the medium through which the route of the shortest distance leads, so that different separation distances result for clearance, distances in casting, distances through solid insulation, creepage distances in air or creepage distances under a protective layer. In addition, the separation distances to be observed are dependent on the maximum voltages occurring between the conductive components.

Details for designing modular electronic components and their housings for a possible use in a modular system for measuring devices are also found in the prior art. Thus, German Patent Application DE 10 2010 033 470 A1 and corresponding U.S. Patent Application Publication 2012/0032822 A1 describes an operating panel for the measuring devices and German Patent Application DE 41 09 475 A1 describes a rotatable display. A rotatable mechanical connection between the sensor unit and the housing of the electronic unit is shown in the German Patent Application DE 10 2004 044 890 A1. An exchangeable connection between the sensor unit via a type of plug having a field bus or alternatively having a programming device can be seen in German Patent Application DE 103 27 013 A1. Further details, such as the easier insertion of a cable into a housing (e.g., German Patent DE 10 2007 036 484 B3 and corresponding U.S. Patent Application Publication 2010/0208769 A1), producing a hard metal threading inside an aluminum housing (e.g., U.S. Pat. No. 3,462,539), the surrounding of lead wires in a device with ceramic or glass casings (e.g., German Utility Model DE 20 2010 007 043 U1), the fixing of electronic components via conical slopes in the housing (e.g., German Patent Application DE 10 2005 024 259 A1) or special devices on the outside of the housing for seals (e.g., German Patent Application DE 10 2010 003 743 A1) can also been found in the prior art and can contribute to the design of the measuring devices and their housings.

SUMMARY OF THE INVENTION

A primary object of the present invention is to provide a measuring device whose electronics are modular, enabling easy adaptation to self-protection.

The indicated object is initially and essentially met with the measuring device being discussed here in that at least one encapsulated contact element is provided. In this case, the contact element is designed separately from the electronic units and the housing, and the contact element is arranged between the two electronic units. Furthermore, the contact element has at least one electronic transmission element for creating an electric connection between the two electronic units.

It is known from the prior art, that electronic devices are located in chambers of a housing separated by a wall and that electronic devices contact one another using transmission elements such as contacts pins, which are arranged in an opening in the wall and are cast there. This means that such a contact element is, more or less, a part of the wall of the housing. It is further known that certain electronic devices have corresponding transmission elements and that, for explosion protection, the entire electronic unit is cast. In the measuring device according to the invention, however, a separate contact element is provided as a self-contained component, which is, in particular, already encapsulated—i.e., encapsulated in itself and for itself—and does not have to be encapsulated within the housing as in the prior art.

Such a contact element that is already ready to be inserted allows, in addition to simplified applicability, also easier adjustment to the housing used or, respectively, to the types of electronic equipment. Thus, the distance between the electronic devices can be easily adjusted by the height of each contact element used between them. Since the contact element is already encapsulated and does not require encapsulation in the housing, defective components can be more easily monitored and replaced in the measuring device according to the invention, since, in the simplest case, only the plug connection between an electronic device and the contact element has to be removed. Different arrangements, which may also comprise more complex structures, of several transmission elements can be made relatively easily without, for example, a support in the housing prior to casting being required, as would be required by the prior art.

Furthermore, an angular arrangement of the electronic devices can also be implemented in this manner in that the contact element comprises one matching angle. The contact for more than two electronic devices can also be implemented in that the contact element comprises a plurality of transmission elements in different solid angles. Since the contact element is separate and already encapsulated, it can significantly simplify the combination of different electronic devices or housings as part of a modular system. Such a measuring device according to the invention, for example, is connected to different sensor units which are used for e.g., flow measurement, level measurement, pH or oxygen content measurement and, for example, are given as Coriolis, as MID or as radar fill level measuring devices.

In one design, it is provided that the transmission element is a contact pin. Preferably, several transmission elements are provided which are designed all or partly as contact pins. The connection between electronic devices can be easily achieved using such contact pins in that matching sockets are provided there. In one design, the contact element has contact pins on the two sides facing the electronic devices or, respectively, there are continuous contact pins. As an alternative, the contact element has contact pins on one side and sockets on the other side. Also any combinations of other transmission elements, such as connectors or cables are possible.

In a further variation, the transmission element is encapsulated within an outer wall of the contact element and/or is set in glass. This encapsulation or the setting in glass is used, in particular, in setting the minimum distances between the current-carrying conductors or contact elements required for the type of ignition protection. In one design, in particular, several transmission elements are provided, all of which are encapsulated within the outer wall of the contact element and/or are set in glass. The outer wall as a part of the outer shell of the contact element can be at least partially made of stainless steel or a plastic. In one variation, the contact element is designed essentially with a stopper shape or plug shape. The basic cross-section is preferably circular, although there is no limitation to this shape. In a further design, the cross-section of the contact element is asymmetric, so that the contact element can be inserted in the housing only in a defined orientation, which automatically leads to defined mounting and contact positions—also for the connected electronic devices.

Advantageously, the contact element and the two electronic devices are designed and attuned to on another in such a manner that the contact element and the two electronic devices are substantially connected with each other without a gap. The dimensions of the electronic devices or their housings and of the contact element are therefore such that there is no gap after being connected to one another. Preferably, this is done without any additional sealing or casting elements. In order to increase the safety, however, additional casting or additional sealing elements are possible around the contact element or, respectively, the two electronic devices.

In an advantageous design, the housing has at least two chambers having a passageway between them. One of the two electronic devices is arranged in each chamber and the contact element in the passageway. The contact element is already encapsulated in the measuring device according to the invention and does not arise—as in the prior art—due to casting of, for example, contact pins, which are lead through such a passageway. In one design, the contact element is arranged in the passageway with an exact fit.

In further designs, the separation between the two electronic units or between the two chambers is reinforced. It is provided in one design that the contact element is cast in the passageway in addition to its encapsulation. Alternately or additionally, it is provided that the transition between at least one electronic device and the contact element is cast. Furthermore, at least one sealing device—in particular an O-ring—is arranged also additionally or alternately between at least one electronic device and the contact element and/or between the contact element and the passageway. As another option, the entire interior of the housing can be cast.

In one embodiment, particular consideration is made to the fact that measuring devices are sometimes exposed to extreme mechanical loads, for example, as part of process automation. If a measuring device is mounted, for example, to a container containing a medium—a silo or tank—with the sensor unit, then the filling of the container or a mixer in the container can cause vibrations of the measuring device and, thus, can also lead to a load on the electronic components or contacts in the measuring device. The same applies if the measuring device is attached to a tube, e.g., for the measurement of the flow. In order to reduce the effects of such vibrations on the electronic components, the following configuration is provided, which is also independent of the above type of configuration of the contact element, but nevertheless makes a very good combination for implementing a measuring device that is as optimum as possible.

In a design, the housing has at least one electronic access to at least one of the two electronic devices. The housing, thus, has an access or an opening through which at least one electronic device is attainable, particularly insertable. A first longitudinal axis extends, in particular, through the electronic access cover. If, for example, the section of the housing, which connects to the electronic access and which preferably comprises an electronic device, is designed in an essentially cylindrical shape—for example, with a circular base surface—then said first longitudinal axis is the longitudinal axis of this cylindrical section. If the electronic access opens, in general, to an access plane, i.e., if the housing ends in such an access plane, then the first longitudinal axis, in particular, is the perpendicular at this access plane, which extends centrally through the electronic access.

Furthermore, the housing has a sensor access for connection to a sensor unit. The sensor unit is used for the actual measurement or monitoring, for example, of a process variable, such as fill level or flow rate, and provides mostly raw data arising from a function of a measurable variable used for the measurement and monitoring of the process variable. A sensor access, i.e., an opening for the sensor unit, is thus provided for the connection of such a sensor unit to the housing. Here, the sensor access opens into a access plane. Since, in many applications, the connection of the measuring device to a container or a tube, etc. is carried out via a flange, such a plane can be referred to as flange plane. A second longitudinal axis extends, in particular, through the sensor access. If this section of the housing, which connects to the sensor access or which is optionally configured for contact with the sensor unit, is essentially cylindrical—possibly also with a circular base surface—, then the second longitudinal axis is also the longitudinal axis of this cylindrical section of the housing used for the transition to the sensor unit. The second longitudinal axis is, in particular, perpendicular to the connecting plane.

In a particular design, the first longitudinal axis and the second longitudinal axis are perpendicular to each other, so that the housing is designed at least partially L- or T-shaped. The angle between the first and second longitudinal axis can also have a different value, so that if necessary, a Y-shape results, if at least a third section is provided in the housing. In another exemplary design, the access plane and the connection plane are arranged relative to one another deviating from a parallel arrangement. The first and second longitudinal axes span, in particular, an orientation plane, which particularly is perpendicular to the access and the connection planes.

Furthermore, at least one electronic device has at least one printed circuit board. Printed circuit boards are mostly used to support the respective electronic components. The printed circuit board is located essentially in a printed circuit board plane. The printed circuit board is arranged in the housing such that the printed circuit board plane is arranged at an angle to the plane of orientation, which differs from an integer multiple of 90°. However, if the electronic access is a circular opening and is used by the connection plane as a specification of an intended south pole, then the printed circuit board in this design is aligned neither in north-south nor in east-west direction.

In one design, the printed circuit board plane is arranged along the bisector of the quadrant, i.e., disposed in a north-east/south-west direction or in a north-west/south-east direction. In a further design, the printed circuit board plane is also arranged at an angle to the connection plane, which also differs from an integer multiple of 90°. The printed circuit board plane is therefore preferably arranged neither perpendicular to the connection plane nor parallel thereto in this design. In a further design, the printed circuit board plane is preferably disposed at a 45° angle to the connection plane. In such an "oblique" arrangement of the circuit board relative to the connection plane, forces caused by vibrations acting on the circuit board and components are reduced, in particular using vector splitting of forces acting in the printed circuit board plane.

In detail, there are a number of possibilities for designing and further developing the measuring device according to the invention. Reference is made to the following description of embodiments in conjunction with the accompanying drawings.

DETAILED DESCRIPTION OF THE INVENTION

Figure 1:
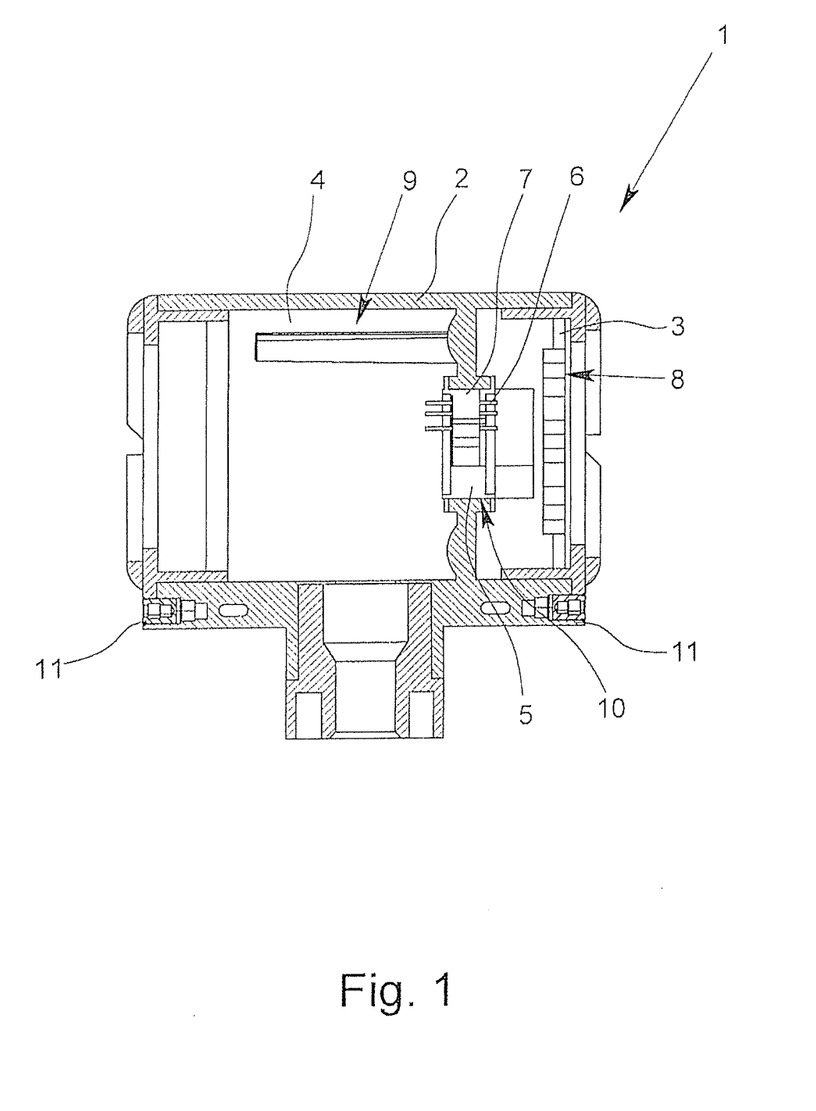
FIG. 1 is a sectional view of a schematic representation essentially showing the fundamental arrangement of a part of a measuring device.

In FIG. 1, a part of a measuring device 1 according to the invention is shown, namely the housing 2, in which the electronic unit is found. To obtain a complete, functional measuring device 1, a corresponding sensor unit only needs to be attached at the bottom of the housing 2, in which each used measuring principle is implemented in order to obtain an electrical measured variable from the process variable (e.g., flow or level) to be measured. Two electronic devices 3, 4 are found in the housing 2, which are arranged in a row in the illustrated implementation of the invention. In the larger electronic device 4, a guiding structure can be seen on the wall, through which the electronic device 4 is more easily and safely introduced into the housing 2 during mounting, and thus, incorrect mounting or damage of individual parts can be prevented. This also means that the electronic device 4, or respectively, the inner wall of the housing 2 is designed with a conical shape. The other electronic device 3, for example, has several clamp contacts, which are arranged in the direction of the inner wall of the housing 2 and their partial multiple and, in particular, redundant configuration allow, for example, a display or control unit to be placed with a selectable orientation and to be contacted.

The contact element 5 is arranged between the two electronic devices 3, 4 in such a manner that it is encapsulated, and in particular, designed separately from the two electronic devices 3, 4. The contact element 5 is used for electrical connection between the electronic devices 3, 4, and also the separation of the two electronic devices 3, 4, for example, to ensure intrinsic safety.

Transmission elements 6 are provided for connection, which are implemented here as pins in both directions. The transmission elements 6 are cast, or respectively, set in glass within the outer wall 7 of the contact element 5, the outer wall being comprised of stainless steel, wherein the required distances between the individual transmission elements 6 for intrinsic safety to be taken into consideration. In an alternative embodiment, the outer wall 7 is made a plastic or a composite material. In the embodiment shown here, the contact element 5 is designed in the shape of a stopper.

The interior of the housing 2 is divided into two chambers 8, 9, in each of which there is an electronic unit 3, 4. The two chambers 8, 9 are separated by a wall that has a passageway 10, which accommodates the contact element 5. In the present case, the passageway 10 and the contact element 5 are designed and attuned to one another in such a manner that the contact element 5 is arranged in the passageway 10 with an exact fit.

In particular, the respective sensor unit is attached here to the downwardly projecting neck of the housing 2, for example, fixed by a screw. By using, for example, a bayonet lock, however, a variation can be implemented, in which the sensor unit and the housing are partially rotatable or pivotable relative to one another. The lower neck allows, for example, the introduction of cables or e.g., flexible printed circuit boards that are part of the sensor unit—not illustrated here—and are to be connected to the electronic devices 3, 4.

During mounting of the measuring device 1 according to the invention, the electronic devices 3, 4 and the contact element 5 can be introduced into the housing 2 and interlocked. If, in particular, the contact element 5 and the respective electronic device 3, 4 are connected to each other without a gap, then no further casting is needed by encapsulating the contact element 5, as is required in the prior art. In particular, connection using plugging is reversible allowing individual components to be replaced, for example, even after mounting.

Further threaded sleeves 11 can be seen in FIG. 1, which are inserted, e.g., pushed, into the housing 2. These sleeves 11 are made, in this case, of stainless steel and can be introduced, e.g., turned or pushed, into a housing 2 made of aluminum or plastic.

Figure 2:
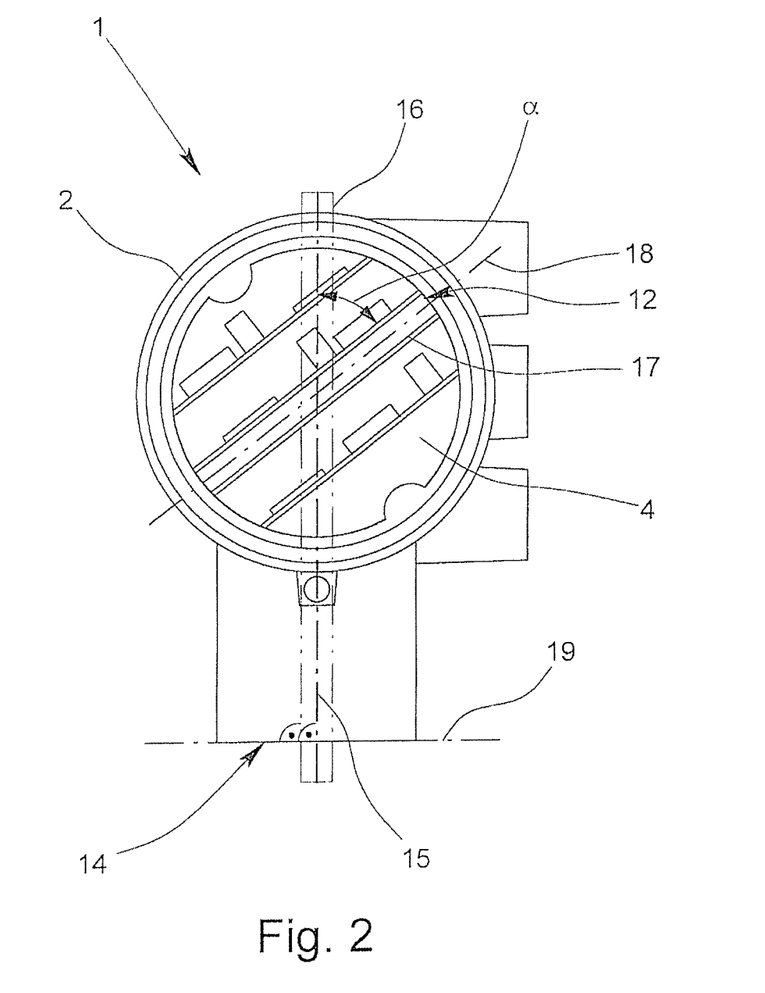
FIG. 2 is a top view of the measuring device from FIG. 1.

FIG. 2 provides a glimpse into the electronic access 12 of the measuring device 1. The first longitudinal axis of this section extends perpendicular into the plane of the figure, in this variation. The electronic device 4 shown has a several printed circuit boards, of which one printed circuit board 17 is located in a printed circuit board plane 18. It can be seen that the other printed circuit boards are located in planes parallel to the printed circuit board plane 18. A sensor access 14 is provided at the bottom of the neck of the housing 2, which is used for connecting and contacting a sensor unit—not shown here. The end of the housing 2 opens into a connection plane 19, on which the second longitudinal axis 15 of this section of housing 2 is perpendicularly situated.

An orientation plane 16 is spanned from the first longitudinal axis and the second longitudinal axis 15 which, here, also runs perpendicular to the plane of the drawing. As can be seen, the printed circuit board plane 18 is inclined at an angle $\alpha=45°$ relative to the orientation plane 16. However, other angles a are implemented in other embodiments not shown here. All the variations have in common that the angle a differs from an integer multiple of 90°, i.e., the printed circuit board plane 18 is neither parallel to the orientation plane 16 nor perpendicular thereto. The printed circuit board 17 is further arranged in a 45° angle to the connection plane 19. At this relative orientation of the printed circuit board 17 relative to the connection plane 19, other angles are also possible, each leading to an inclined position of the printed circuit board 17. This inclination with respect to the connection plane 19, which mostly results in the attachment of the measuring device 1 to a container or a pipe, reduces the effects of vibrations on the printed circuit board 17 or its components or the contacts of the components.

In the version shown, it is seen further that the housing 2 has three additional side accesses, for example, for cable connections.

Figure 3:
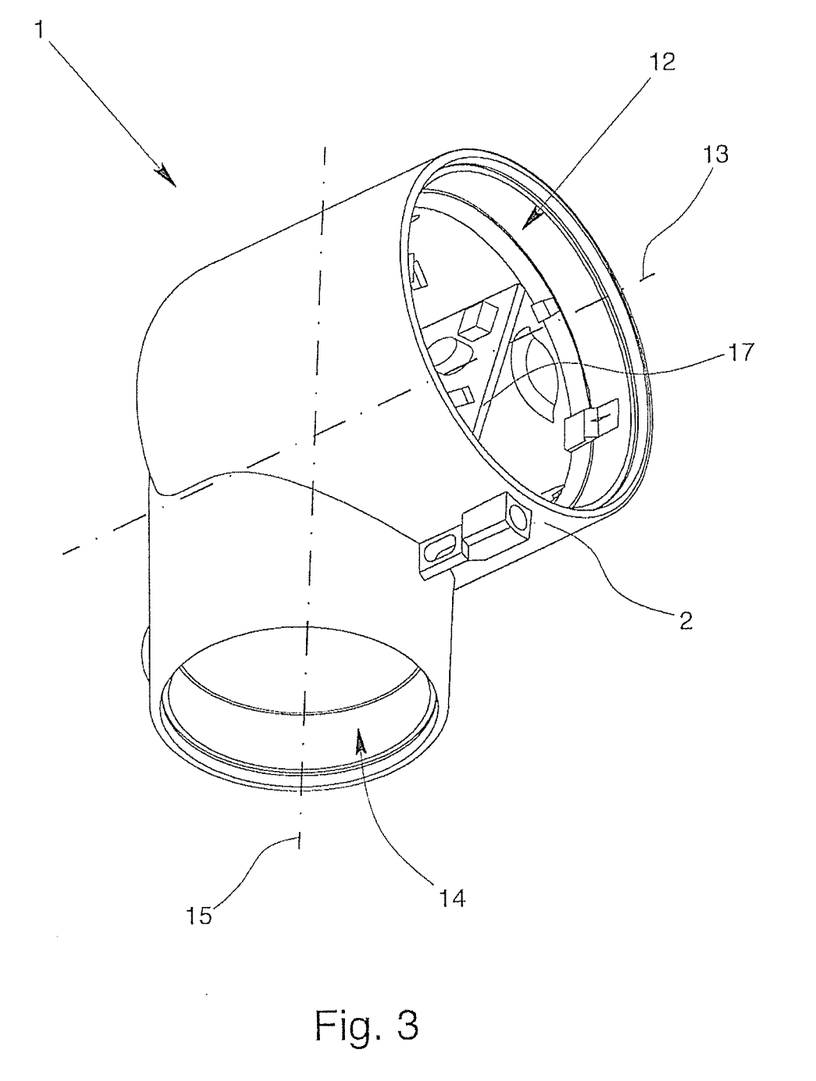
FIG. 3 is a perspective view of a housing of a measuring device.

FIG. 3 shows a housing 2, in which the first longitudinal axis 13 of the electronic access 12 and the second longitudinal axis 15 of the sensor access 14 are shown. In the variation illustrated, the two longitudinal axes 13, 15 form a right angle with respect to one another, and thus, define an orientation plane, which can be regarded as a plane of symmetry of the housing 2 in respect to the two sections shown. The printed circuit board 17 indicated herein with respect to its position is visibly inclined relative to the plane formed by the two longitudinal axes 13, 14. Below the electronic access 12, a formation can be seen that allows not only a lid to be attached with a screw on the housing 2, but even a seal.

Figure 4:
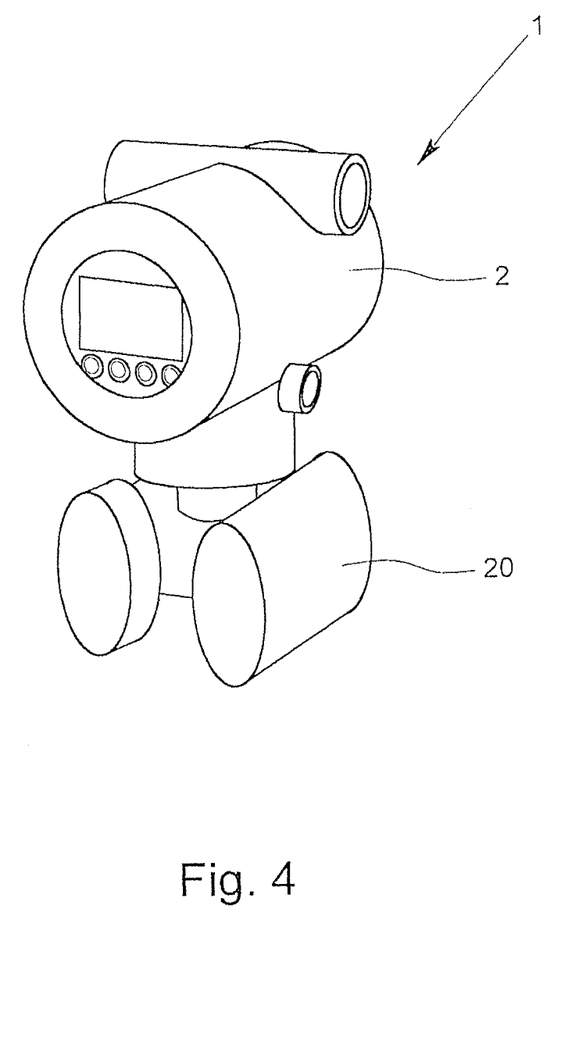
FIG. 4 is a perspective view of a measuring device.

The measuring device 1 in FIG. 4 comprises the housing 2 and the sensor unit 20. Both are connected to each other, for example, via a screw connection. The specifically illustrated sensor unit 20 is only one example and it is possible to connect to such a housing 2 any other desired types of sensor units 20 for different measuring principles. It is essential for the combination of the different component groups that the sections coming in contact are matched to each other, for example, appropriate neck geometries should be taken into consideration for connection between the housing 2 and the sensor unit 20. If, in particular, a connection exists between the housing 2 and the sensor unit 20 via threading, then the requirements of different explosion protection standards can be met using a corresponding slope or a corresponding number of threads between the two.

The housing 2 is closed with a lid in the version shown, through which a display and control element can be seen. Mechanical keys with a special film are provided for operation. Alternately, however, a capacitive or inductive keyboard can also be implemented that responds to the approach of a finger or a pen. In a further variation, Hall sensors are provided in the housing 2, which can be operated by means of magnetic pins through a closed lid, and thus, also meet the explosion protection requirements. If contact pins are used between a display module and the electronic device behind it, the securing of the display module is simplified and can optionally be easily implemented by a rotation of the display unit relative to the housing 2, in that, for example, the number of contact pins is increased and the contact pins are redundant at different spatial angles. Here, pins or sockets can also be varied in the display unit or the associated electronic unit. Alternately, contact is made by cable, so that only the position of the display and control unit must allow different relative setting.

Figure 5:
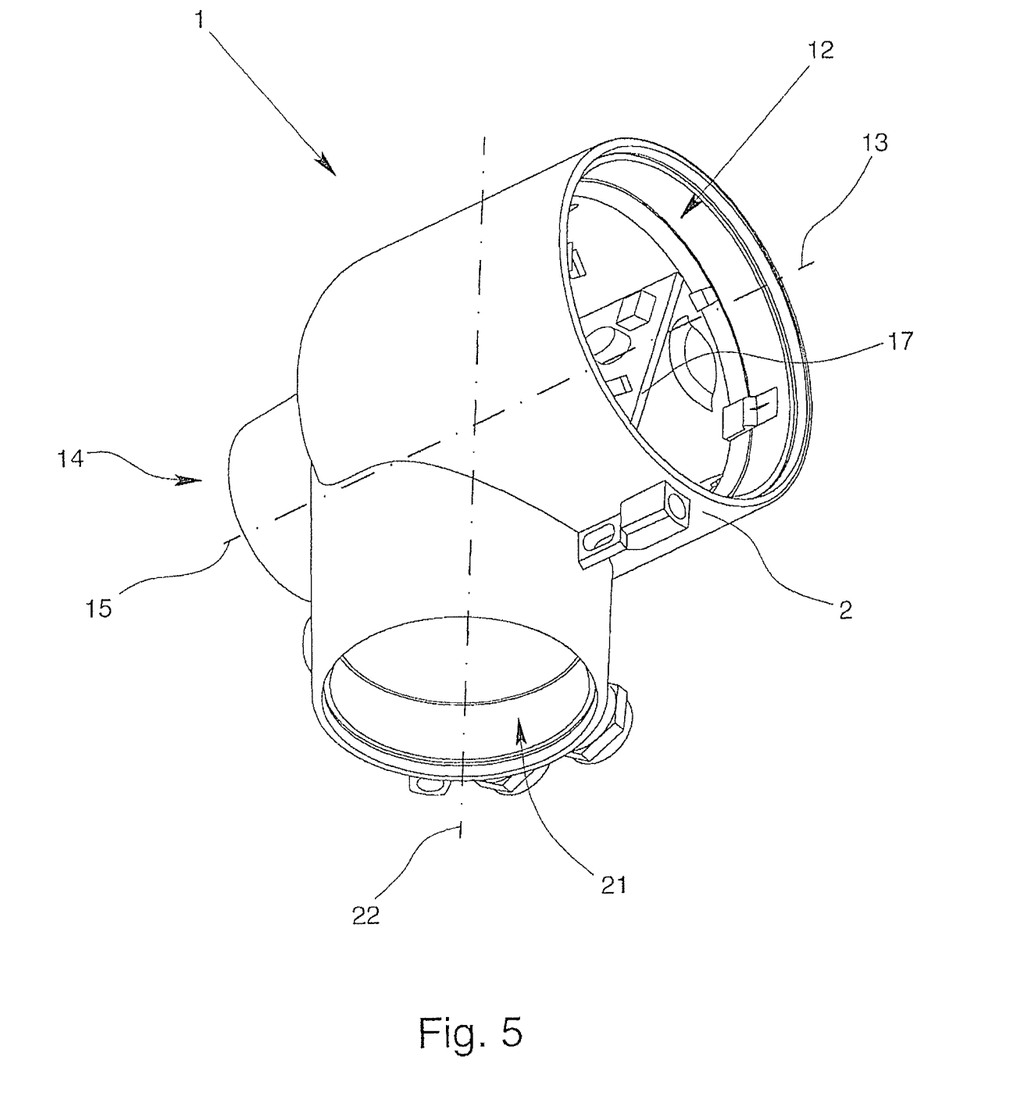
FIG. 5 is a perspective view of a further variation of the housing of a measuring device.

In the housing 2 of the measuring device 1 in FIG. 5, the first longitudinal axis 13 of the electronic access 12 and the second longitudinal axis 15 of the sensor access 14 coincide since, in this variation, both accesses 12, 14 are arranged aligned in a row, wherein a connection as shown in FIG. 1 exists between the components of the measuring device 1 within the housing 2. A printed circuit board 17 from one electronic device is individually emphasized here in the figure to better identify its orientation. The housing 2 also has an electrical connecting space 21 with a third longitudinal axis 22, which is arranged essentially perpendicular to the first longitudinal axis 13 and the second longitudinal axis 15. The third longitudinal axis 22 and the first 13 or second longitudinal axis 15 span a plane, to which the printed circuit board plane of the circuit board 17 is arranged at an angle that is not an integer multiple of 90°.

What is claimed is:

1. Measuring device comprising:
   at least one housing,
   at least two electronic units, and
   at least one encapsulated contact element that is separate from the electronic units and the housing, the at least one encapsulated contact element being arranged between the electronic units, and having at least one electronic transmission element for creating an electrical connection between the at least two electronic units;
   wherein the housing has at least one electronic access to at least one of the at least two electronic units, wherein a first longitudinal axis of the housing extends through the electronic access, wherein the housing has a sensor access for connecting to a sensor unit, wherein a second longitudinal axis of the housing extends through the sensor access, wherein the first longitudinal axis and the second longitudinal axis span an orientation plane, wherein at least one electronic unit has at least one printed circuit board that lies essentially in a printed circuit board plane, the at least one printed circuit board being arranged in the housing in such a manner that the printed circuit board plane is at an angle relative to the orientation plane that differs from an integral multiple of 90°.

2. Measuring device according to claim 1, wherein the transmission element is a contact pin.

3. Measuring device according to claim 1, wherein the transmission element has at least one of been molded and set in glass within an outer wall of the contact element.

4. Measuring device according to claim 3, wherein the outer wall is made at least partially of stainless steel or a synthetic material.

5. Measuring device according to claim 1, wherein the contact element has essentially a plug shape.

6. Measuring device according to claim 1, wherein the contact element and the electronic units are configured and attuned to one another in such a manner that the contact element and the electronic units are joined together essentially gap-free.

7. Measuring device according to claim 1, wherein the housing has at least two chambers between which a passage exists, one of the electronic units being arranged in each of the chambers and the contact element being arranged in the passage.

8. Measuring device according to claim 7, wherein at least one of: the contact element is molded into the passage, the transition between at least one electronic unit and the contact element is molded and at least one sealing device is arranged at least one of between at least one electronic unit and the contact element and between the contact element and the passage.

9. Measuring device according to claim 1, wherein the sensor access leads into a connection plane, and wherein the at least one printed circuit board is arranged in the housing in such a manner that the printed circuit board plane is arranged at an angle relative to the connection plane that differs from an integral multiple of 90°.

\* \* \* \* \*